(12) United States Patent
Jeong et al.

(10) Patent No.: US 7,590,281 B2
(45) Date of Patent: *Sep. 15, 2009

(54) STEREO IMAGE MATCHING METHOD AND SYSTEM USING IMAGE MULTIPLE LINES

(75) Inventors: Hong Jeong, Kyungsangbuk-do (KR); Sungchan Park, Kyungsangbuk-do (KR)

(73) Assignee: Postech Foundation, Kyungsankbuk-Do (KR)

( * ) Notice: Subject to any disclaimer, the term of this patent is extended or adjusted under 35 U.S.C. 154(b) by 932 days.

This patent is subject to a terminal disclaimer.

(21) Appl. No.: 11/032,253

(22) Filed: Jan. 10, 2005

(65) Prior Publication Data
US 2006/0055703 A1    Mar. 16, 2006

(30) Foreign Application Priority Data
Sep. 10, 2004    (KR)    .................... 10-2004-0072531

(51) Int. Cl.
*G06K 9/00*    (2006.01)
(52) U.S. Cl. .................. 382/154; 382/303; 382/304
(58) Field of Classification Search .............. 382/154, 382/303, 304
See application file for complete search history.

(56) References Cited

U.S. PATENT DOCUMENTS 5,910,817 A * 6/1999 Ohashi et al. ............... 348/159
6,801,653 B1 * 10/2004 Wu et al. .................... 382/154
2002/0025075 A1   2/2002 Jeong et al. .................. 382/17

FOREIGN PATENT DOCUMENTS
EP    1 445 964 A2    8/2004

OTHER PUBLICATIONS

Hong Jeong et al. "Trellis-Based Systolic Multi-Layer Stereo Matching," Signal Processing Systems, 2003, SIPS 2003, IEEE Workshop Aug. 27-Aug. 29, 2003, Piscataway, NJ, US, IEEE, Aug. 27, 2003, pp. 257-262, XP 010661025, ISBN: 0-7803-7798-8.
U. Dhond and J.K. Aggarwal, "Structure From Stereo—A Review," *IEEE Trans. Systems, Man, and Cybernetics*, vol. 19, No. 6, Nov./Dec. 1989.

* cited by examiner

*Primary Examiner*—Matthew C Bella
*Assistant Examiner*—Mike Rahmjoo
(74) *Attorney, Agent, or Firm*—K&L Gates LLP

(57) ABSTRACT

Disclosed is a stereo image matching method for re-creating 3-dimensional spatial information from a pair of 2-dimensional images. The conventional stereo image matching method generates much noise from a disparity value in the vertical direction, but the present invention uses disparity information of adjacent image lines as a constraint condition to eliminate the noise in the vertical direction, and compress the disparity by using a differential coding method to thereby increase a compression rate.

8 Claims, 11 Drawing Sheets pixels corresponding to the same position of (X, Y, Z) in the 3-dimensional space on image lines on the left image epipolar line and the right image epipolar line. In this instance, a disparity of "d" for the conjugate pixel pair is defined to be $d=x^r-x^l$. The disparity has distance information, and a geometrical distance calculated from the disparity is referred to as a depth. Hence, 3-dimensional distance information and shape information on an observation space can be measured by calculating the disparity in real-time from an input image.

An article of "Structure from stereo" by Umesh R. Dhond and J. K. Aggarwal from a Review, IEEE Transactions on Systems, Man, and Cybernetics, 19(6):553-572, November/December 1989 discloses the basic concept, and a US published application of No. 2002-0025075 discloses a stereo image matching realization system.

In the above-noted prior art as shown in FIG. 12, much noise is generated in the vertical direction since the image lines $g_{ml}$ and $g_{mr}$ on the $m^{th}$ right and left epipolar lines are independently calculated. That is, the disparity in the vertical direction on the disparity image is not accurately displayed because of an influence of noise. When the left image of FIG. 13A and the right image of FIG. 13B are input, the image with much noise is displayed as shown in FIG. 13D.

SUMMARY OF THE INVENTION

The present invention provides a stereo image matching method for reducing vertical disparity noise.

In the present invention, the disparity of image lines is used.

In one aspect of the present invention, a stereo image matching system using image lines comprises: an image processor for converting images input by first and second cameras into digital signals, and outputting first and second pixel data; and an image matcher for determining a predetermined cost from the first and second pixel data on the same epipolar line, tracking a first decision value for determining the predetermined cost, and using the first decision value estimated from the first and second pixel data to output a second decision value.

The first and second pixel data are pixel data of left and right image lines on the same epipolar line.

The image matcher may comprise: a first input buffer and a second input buffer for respectively arranging the first and second pixel data, and outputting them; and a processing element array for receiving the first and second pixel data from the first and second input buffers, and tracking the first and second decision values.

The processing element array may comprise: a plurality of first image registers for sequentially receiving the first pixel data; a plurality of second image registers for sequentially receiving the second pixel data; and a plurality of processing elements for receiving the first and second pixel data from the first and second registers, and tracking the first and second decision values.

The processing element transmits and receives costs and activation signals to/from adjacent processing elements.

The activation signal may comprise a multi-line processing activation signal for calculating a multi-line cost and a backward processing activation signal of adjacent processing elements.

The processing element may comprise: a forward processor for determining a cost from the first and second pixel data and the multi-line processing activation signal, and calculating the first decision value for representing the determined cost; a stack for storing the first decision value; and a backward processor for using the first decision value on the adjacent epipolar line and the backward processing activation signal and calculating the second decision value.

Costs of cost registers of forward processors excluding the $0^{th}$ forward processor are established to be maximum when the forward processors are reset.

Input orders of the first and second pixel data input to the first and second image registers are different according to the condition whether image lines on the epipolar lines corresponding to the input first and second pixel data are odd or even in the images.

In another aspect of the present invention, a stereo image matching method using image lines, comprises: receiving left and right pixel data from left and right cameras; arranging left and right pixel data of image lines on epipolar lines, and sequentially outputting them to a plurality of first and second image registers; allowing the forward processors to determine predetermined costs from the left and right pixel data output by the first and second image registers and track a first decision value for determining the costs; and allowing the backward processors to output a second decision value which is an optimal decision value from the first decision value for the adjacent image line, wherein the forward processors and the backward processors are concurrently performed.

In still another aspect of the present invention, a stereo image matching method using image lines comprises: receiving left and right pixel data from left and right cameras; arranging left and right pixel data of image lines on epipolar lines, and sequentially outputting them to a plurality of first and second image registers; allowing the forward processors to determine predetermined costs from the left and right pixel data output by the first and second image registers and track a first decision value for determining the costs; and allowing the backward processors to output a second decision value which is an optimal decision value from the first decision value for the adjacent image line, wherein the backward processors are performed after the forward processors are performed, and the forward processors and the backward processors can be performed at high speed due to the pipeline architecture.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
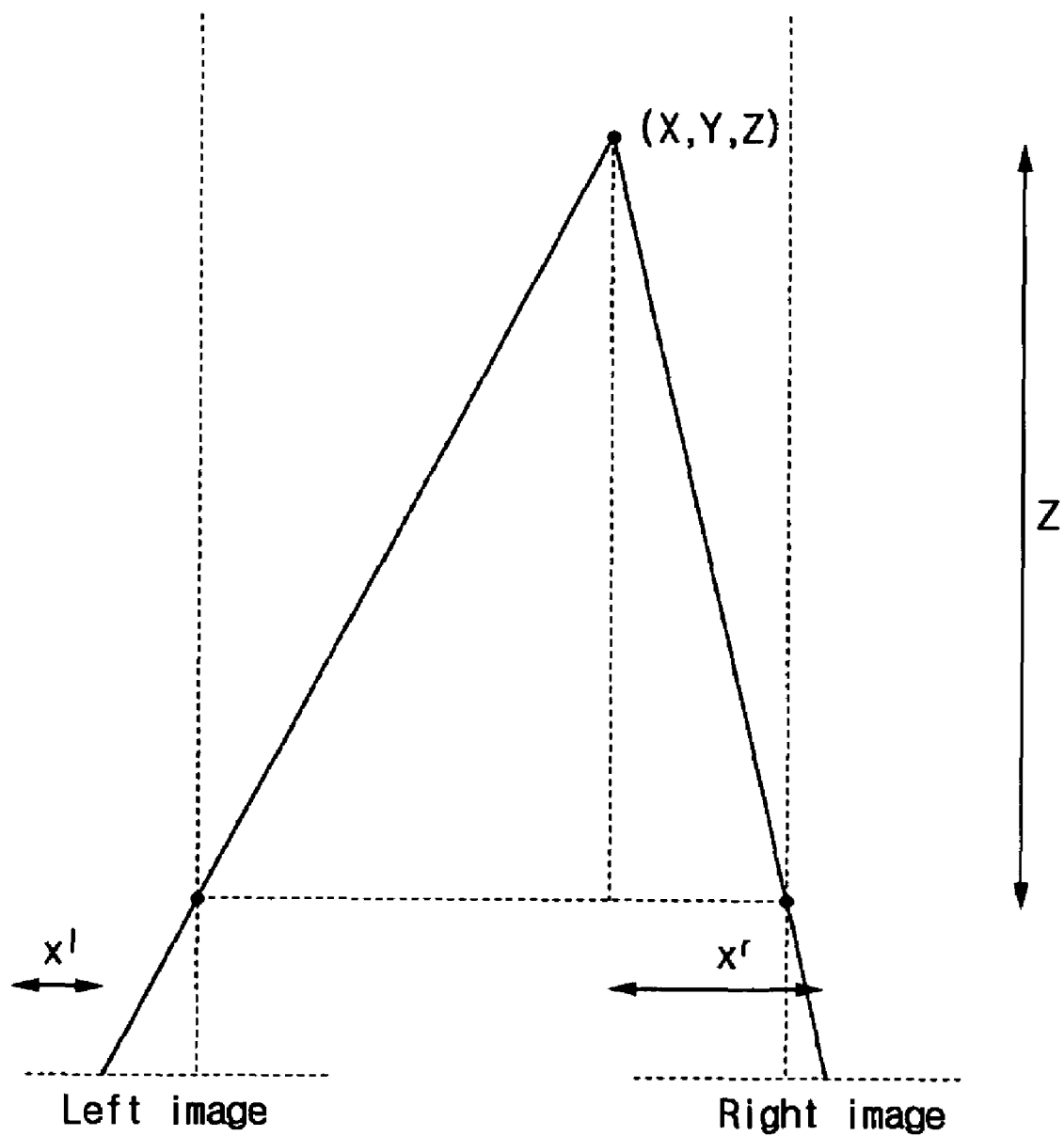
FIG. 1 shows a stereo image matching diagram of the prior art.

In the following detailed description, only an exemplary embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive. To clarify the present invention, parts which are not described in the specification are omitted, and parts for which similar descriptions are provided have the same reference numerals.

A stereo image matching method and system using a plurality of image lines according to exemplary embodiments of the present invention will be described with reference to drawings.

A stereo image matching system using image lines according to a first exemplary embodiment of the present invention will be described with reference to FIGS. 2 to 7.

Figure 2:
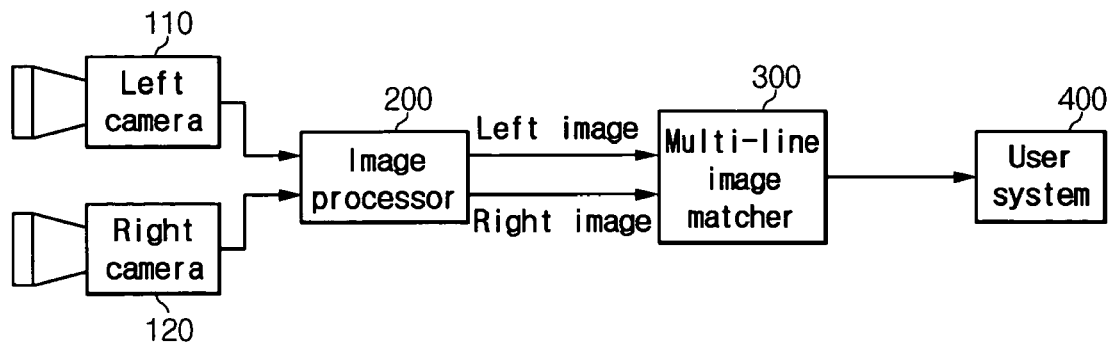
FIG. 2 shows a block diagram of a stereo image matching system according to a first exemplary embodiment of the present invention.
Figure 3:
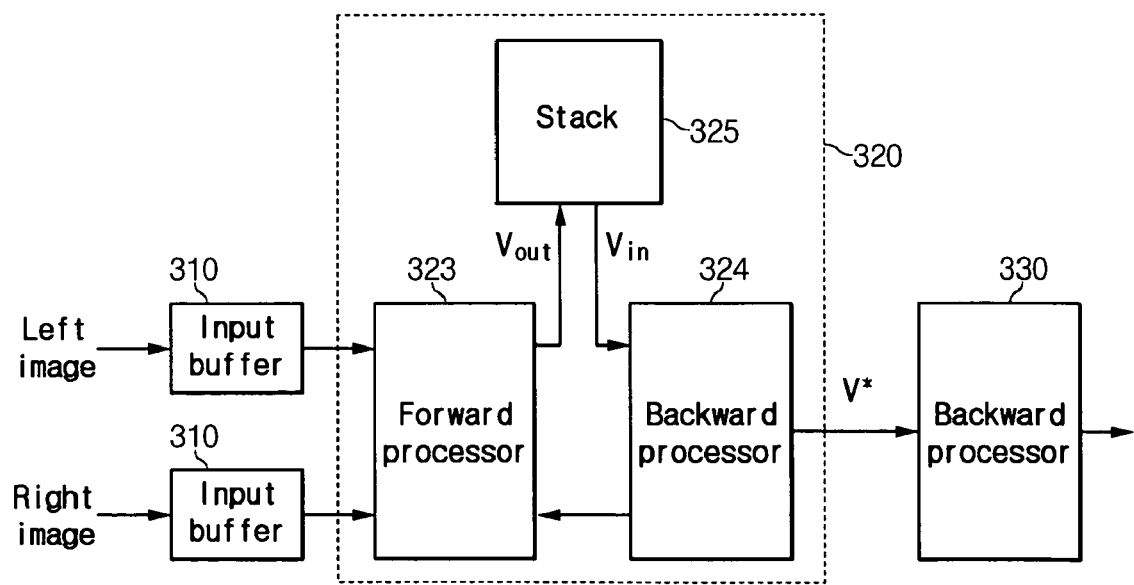
FIG. 3 shows a block diagram of a multi-line stereo image matcher of the stereo image matching system according to a first exemplary embodiment of the present invention.
Figure 4:
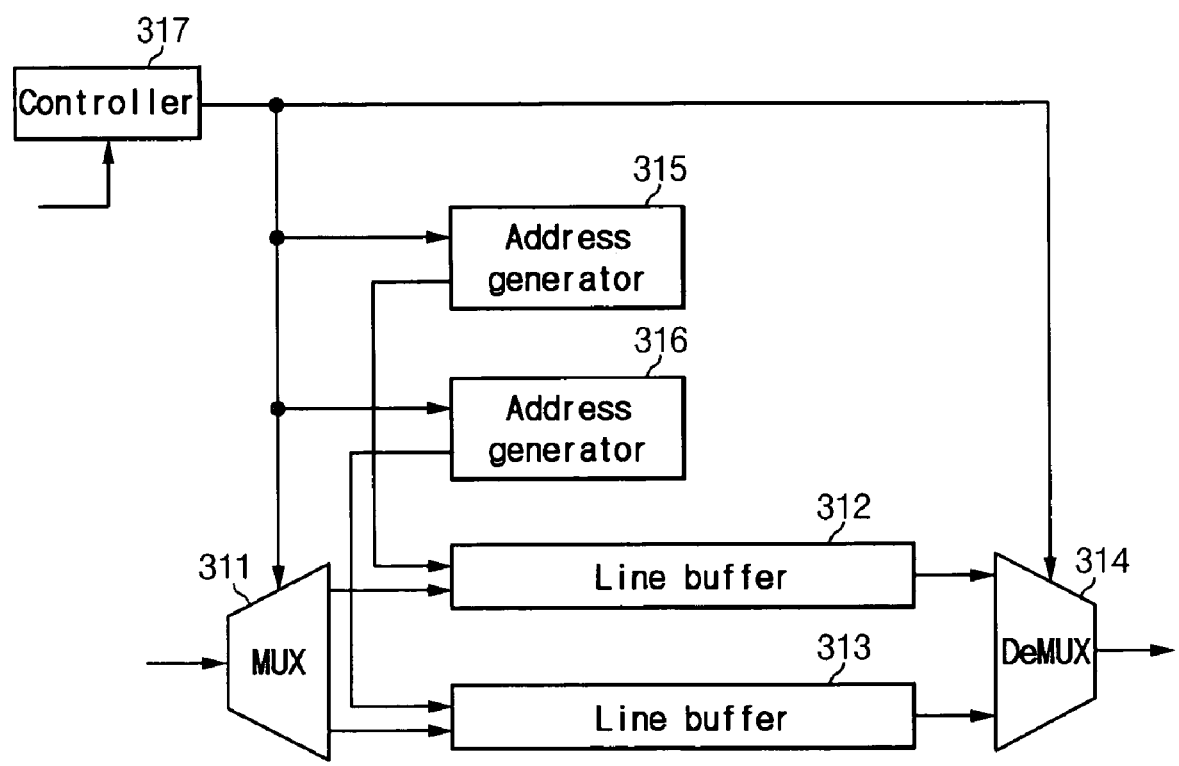
FIG. 4 shows a block diagram of an input buffer shown in FIG. 3.
Figure 5:
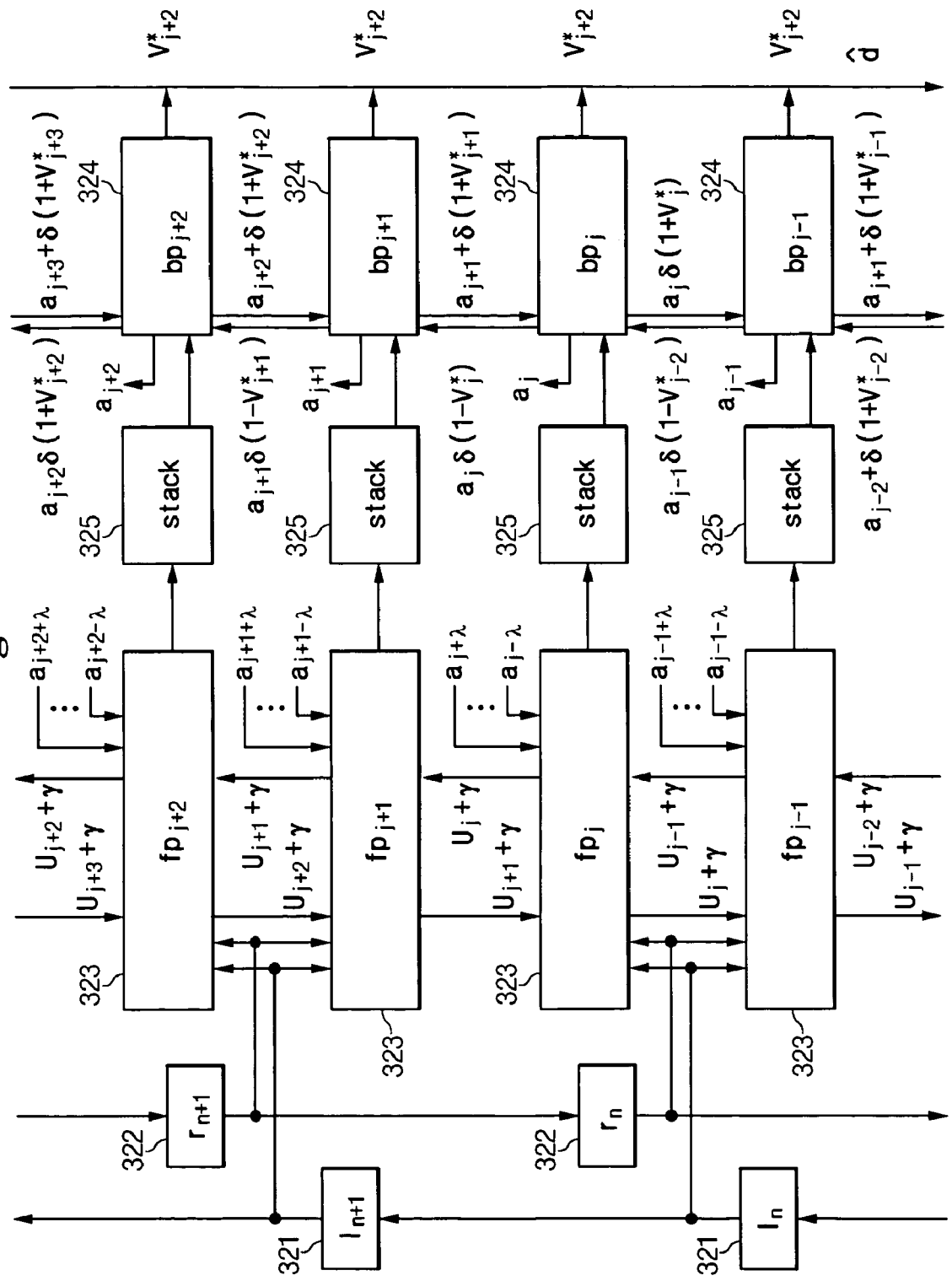
FIG. 5 shows a detailed block diagram of the multi-line stereo image matcher of FIG. 3.
Figure 6:
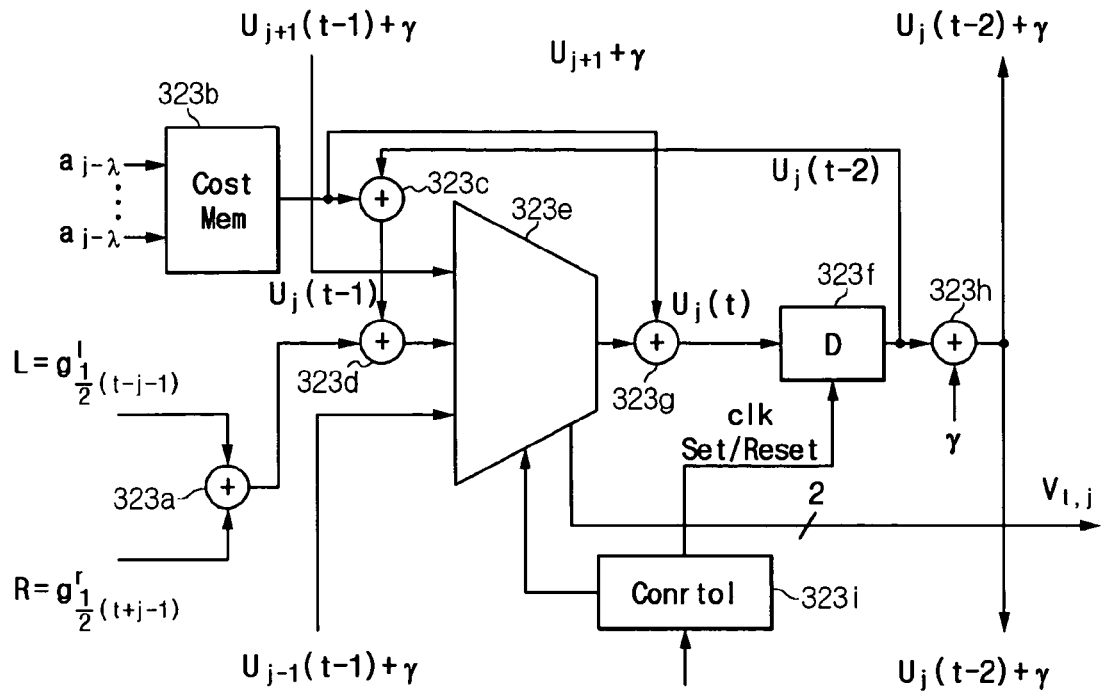
FIG. 6 and FIG. 7 show a forward processor and a backward processor of FIG. 5 respectively.
Figure 7:
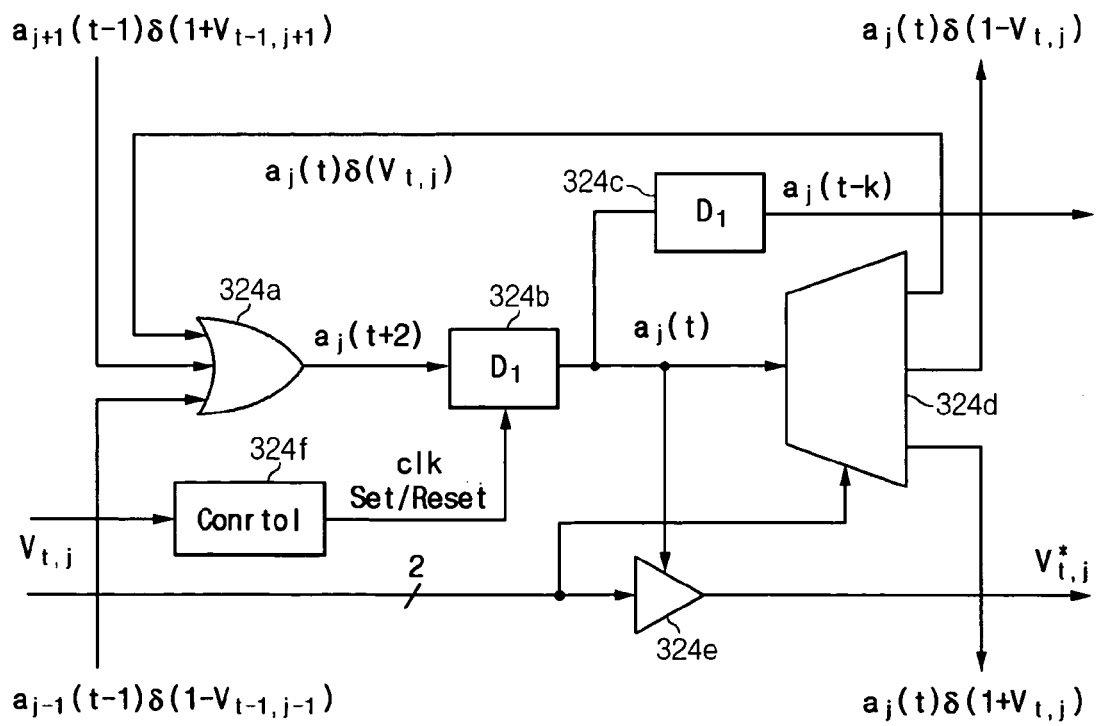

FIG. 2 shows a block diagram of a stereo image matching system according to a first exemplary embodiment of the present invention. FIG. 3 shows a block diagram of a multi-line stereo image matcher of the stereo image matching system according to the first exemplary embodiment of the present invention. FIG. 4 shows a block diagram of an input buffer shown in FIG. 3. FIG. 5 shows a detailed block diagram of the multi-line stereo image matcher of FIG. 3. FIGS. 6 and 7 show a forward processor and a backward processor of FIG. 5 of the diagram respectively.

As shown in FIG. 2, the stereo image matching system comprises a left camera 110, a right camera 120, an image processor 200, a multi-line image matcher 300, and a user system 400. The left and right cameras 110 and 120 take left and right images of a subject, and transmit the image signals to the image processor 200. The image processor 200 converts the left and right image signals into digital signals, and outputs the same. The multi-line image matcher 300 calculates a decision value from the digital image signals provided by the image processor 200, and outputs a disparity value. The user system 400 receives a distance image caused by the disparity value output by the multi-line image matcher 300, and uses it for subsequent processes.

Referring to FIG. 3, the multi-line image matcher 300 includes two input buffers 310, a processing element array 320, and an encoder 330. The input buffers 310 respectively receive left image signals and right image signals (pixel data), rearrange the pixel data according to a control signal, and output the rearranged pixel data. The processing element array 320 uses disparity values of adjacent image lines to find the disparity of the input pixel data, and the encoder 330 converts the disparity values into an appropriate format and outputs result signals.

The multi-line image matcher 300 sequentially receives pixel data of left and right images on the epipolar lines, calculates a disparity value, and outputs the disparity value, and this process of outputting the disparity value is repeatedly performed for the image lines on the epipolar lines of a pair of images.

Referring to FIG. 4, the input buffer 310 of FIG. 2 includes a multiplexer 311, two line buffers 312 and 313, a demultiplexer 314, two address generators 315 and 316, and a controller 317. The multiplexer 311 outputs the pixel data to one of the line buffers 312 and 313 according to control by the controller 317. The two address generators 315 and 316 select data to be output from among the data stored in the line buffers 312 and 313 according to control by the controller 317. The demultiplexer 314 selects one of the pixel data output by the line buffers 312 and 313 and outputs the same according to control by the controller 317.

Referring to FIG. 3 and FIG. 5, the processing element array 320 of FIG. 2 includes N/2 left image registers 321 ($I_2$ to $I_{N/2}$), N/2 right image registers $r_{N/2-1}$ to $r_1$, N forward processors 323 ($fp_1$ to $fp_N$), N backward processors 324 ($bp_1$ to $bP_N$), and N stacks 325. The forward processors 323, the backward processors 324, and the stacks 325 form processing elements which are provided in a linear array format up to the designated maximum disparity, and each of which exchanges information with adjacent processing elements and processes it in parallel. The above-noted configuration allows a full-speed operation irrespective of a number of processing elements.

Pixel data on the left image epipolar line are input to the left image register $I_1$ through the input buffer 310 according to a sync signal, and the pixel data input to the left image register $I_1$ are sequentially shifted to the subsequent left image registers $I_2$ to $I_{N/2}$. In a like manner, pixel data on the right image epipolar line are input to the right image register $r_{N/2}$ through the input buffer 310, and the pixel data input to the right image register $r_{N/2}$ are sequentially shifted to the subsequent right image registers $r_{N/2-1}$ to $r_1$. As shown in FIG. 3, a left image register $I_n$ and a right image register $r_n$ are formed to correspond to two forward processors $fp_j$ and $fp_{j-1}$.

Referring to FIGS. 6 and 7, the $j^{th}$ processing element ($1 \leq j \leq N$) in the processing element array 320 of FIG. 5 will now be described.

Referring to FIG. 6, the forward processor 323 $fp_j$ includes an absolute value calculator 323a, a multi-line cost memory 323b, adders 323c and 323d, a multiplexer 323e, a cost register 323f, adders 323g and 323h, and a controller 323i. The forward processor 323 $fp_j$ receives pixel data of the left and right image lines on the epipolar lines according to clock signals t, calculates a decision value, and stores the decision value in the stack 325.

The absolute value calculator 323a receives pixel data from the left and right image registers 321 and 322, and uses the absolute value of a difference between the pixel data $$L_n\left(g^l_{\frac{1}{2}(t-j-1)}\right)$$

of the left image and the pixel data $$R_n\left(g^r_{\frac{1}{2}(t+j-1)}\right)$$

of the right image to calculate a matching cost. The multi-line cost memory 323b determines a multi-line cost by using activation signals $[a_{j-\lambda}, a_{j+\lambda}]$ for multi-line processing, and outputs the multi-line cost. The multi-line cost memory 323b outputs a small cost in the case of an activation signal of a near processing element, and outputs a big cost in the case of an activation signal of a far processing element, which will be described with reference to FIG. 7.

The adder 323c adds a cost $U_j(t-2)$ which is fed back from the cost register 323f and is in advance of two clock signals and a multi-line cost output by the cost memory 323b, and the adder 323d adds a matching cost of the absolute value calculator 323a to the value added by the adder 323c.

The multiplexer 323e concurrently outputs the least cost from among costs $U_{j+1}(t-1)+\gamma$ and $U_{j-1}(t-1)+\gamma$ which are output by the $(j+1)^{th}$ forward processor 323 and the $(j-1)^{th}$ forward processor 323 and are in advance of one clock signal, and an output $U_j(t-1)$ of the adder 323d according to control by the controller 323h, and outputs a decision value of $V_{t,j}$ which represents a path of the least cost. The adder 323g adds a multi-line cost of the multi-line cost memory 323b to the output of the multiplexer 323e, and outputs the added result as a cost $U_j(t)$ of the current clock signal so that the cost $U_j(t)$ may be stored in the cost register 323f. The adder 323h adds an occlusion cost $\gamma$ to the cost $U_j(t-2)$ which is output by the cost register 323f and is in advance of two clock signals, and outputs the added result to the adjacent $(j+1)^{th}$ and $(j-1)^{th}$ forward processors 323.

Referring to FIG. 7, the backward processor 324 ($bp_j$) of FIG. 5 includes an OR gate 324a, a one-bit activation register 324b, a D buffer 324c, a demultiplexer 324d, a tri-state buffer 324e, and a controller 324f. The backward processor 324 operates the decision value read from the stack 325, calculates a disparity value, and outputs the disparity value according to clock signals.

The OR gate 324a receives activation signals $a_{j+1}(t-1)\delta(1+V_{t-1,j+1})$ and $a_{j-1}(t-1)\delta(1-V_{t-1,j-1})$ of the adjacent $(j+1)^{th}$ and $(j-1)^{th}$ backward processors 324 and an activation signal $a_j(t)\delta(V_{t,j})$ which is fed back from the demultiplexer 324d. An output of the OR gate 324a is stored in the activation register 324b as an activation bit value $a_j(t+2)$ after two clock signals according to control by the controller 323f. An output $a_j(t)$ of the activation register 324b is stored in the D buffer 324c, and the D buffer 324c outputs the activation bit value after k clock signals are counted. As described, the D buffer 324c receives the activation bit value and outputs it as a multi-line activation signal which is used to be synchronized with the backward processor when the multi-line activation signal is input to the forward processor 323 for receiving a multi-line processing activation signal.

The demultiplexer 324d demultiplexes the data input by the activation register 324b according to the decision value of $V_{t,j}$ input by the forward processor 323 through the stack 325, outputs backward processing activation signals $a_j(t)\delta(1-V_{t,j})$ and $a_j(t)\delta(1+V_{t,j})$ to the adjacent backward processor 324, and feeds the activation signal $a_j(t)\delta(V_{t,j})$ back to the OR gate 324a. The tri-state buffer 324e receives the decision value of $V_{t,j}$ from the stack 325, and outputs an optimal decision value of $V^*_{t,j}$ which represents increment/decrement of disparity according to an output by the activation register 324b. The tri-state buffer 324e outputs the input value when the activation bit value $a_j(t)$ is given to be 1, and the tri-state buffer 324e becomes a high impedance state and outputs no value when the activation bit value $a_j(t)$ is not 1.

The addition of decision values $V^*_{t,j}$ output by the backward processor $Bp_j$ produces a disparity value, and since the disparity value is gradually changed depending on the variation of decision values, the compression rate can be increased by a differential-coding compression method. That is, the encoder 330 can output the decision value of $V^*_{t,j}$ without outputting the disparity value added with the decision value of $V^*_{t,j}$.

The decision value of $V^*_{t,j}$ represents variations of the path to thus have three values of no path variation, upward path variation, and downward path variation, and hence, the decision value of $V^*_{t,j}$ are represented as 00, 01, and 10 in two bits, and 00 is a dummy bit. Two decision values of $V^*_{t,j}$ and $V^*_{t-1,j}$ require four bits, and in this instance, 0110 and 1001 can be considered to belong to the same case as that of 0000 since 0110 and 1001 have a very rare probability of geometric existence. Therefore, as given in Table 1, the two decision values can be represented in three bits by processing the dummy data and encoding them. Also, flag data are allowed since a number can be assigned as a flag.

TABLE 1

| $V^*_{t,j}$ | $V^*_{t-1,j}$ | Outputs |
| --- | --- | --- |
| 00 | 00 | 0 |
| 00 | 01 | 1 |
| 00 | 10 | 2 |
| 01 | 00 | 3 |
| 01 | 01 | 4 |
| 01 | 10 | 0 |
| 10 | 00 | 5 |
| 10 | 01 | 0 |
| 10 | 10 | 6 |
| flag | flag | 7 |

Figure 8:
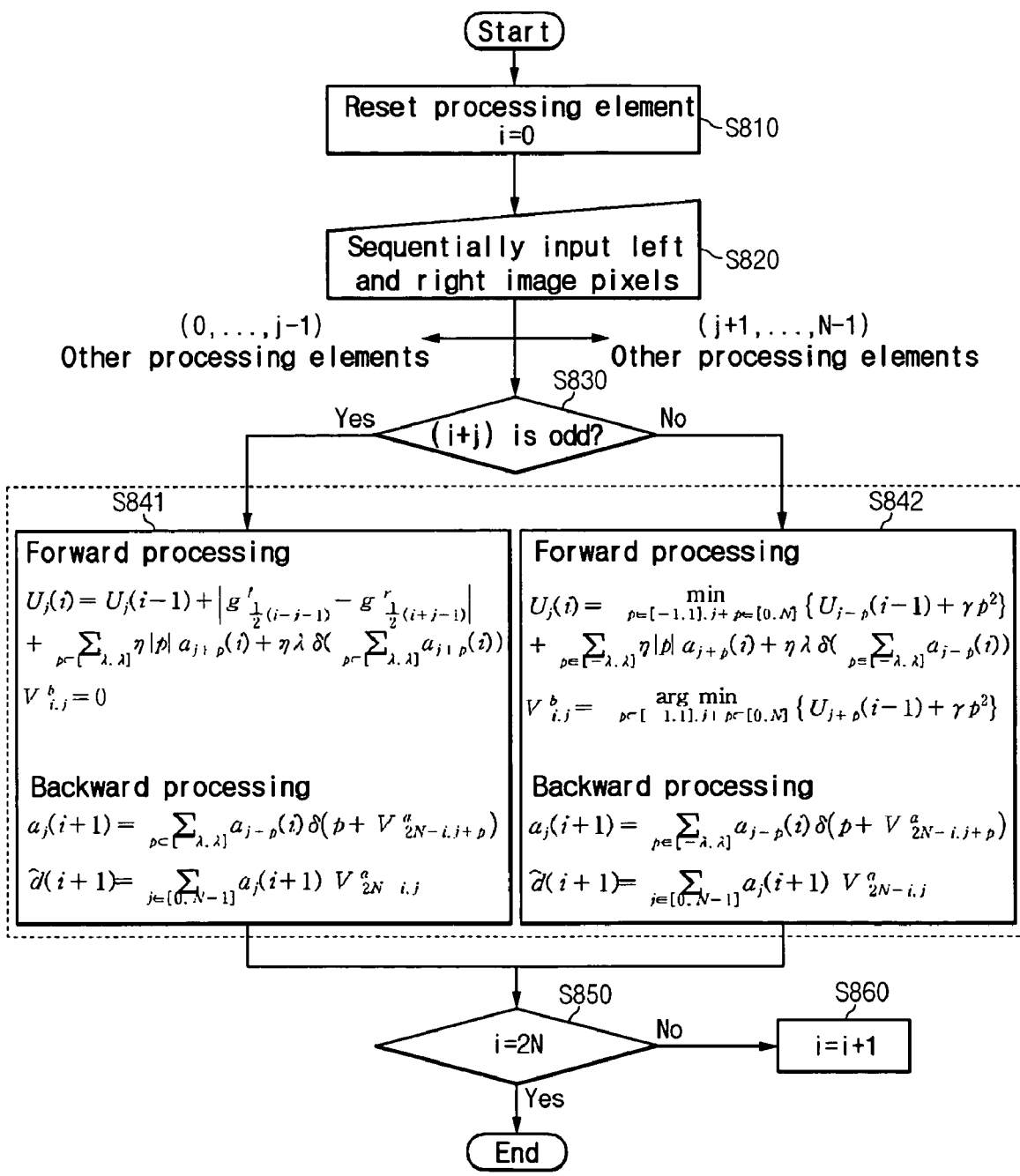
FIG. 8 and FIG. 9 respectively show a flowchart for the stereo image matching system according to the first exemplary embodiment to process pixel data of an even image line and a flowchart for the stereo image matching system to process pixel data of an odd image line.
Figure 9:
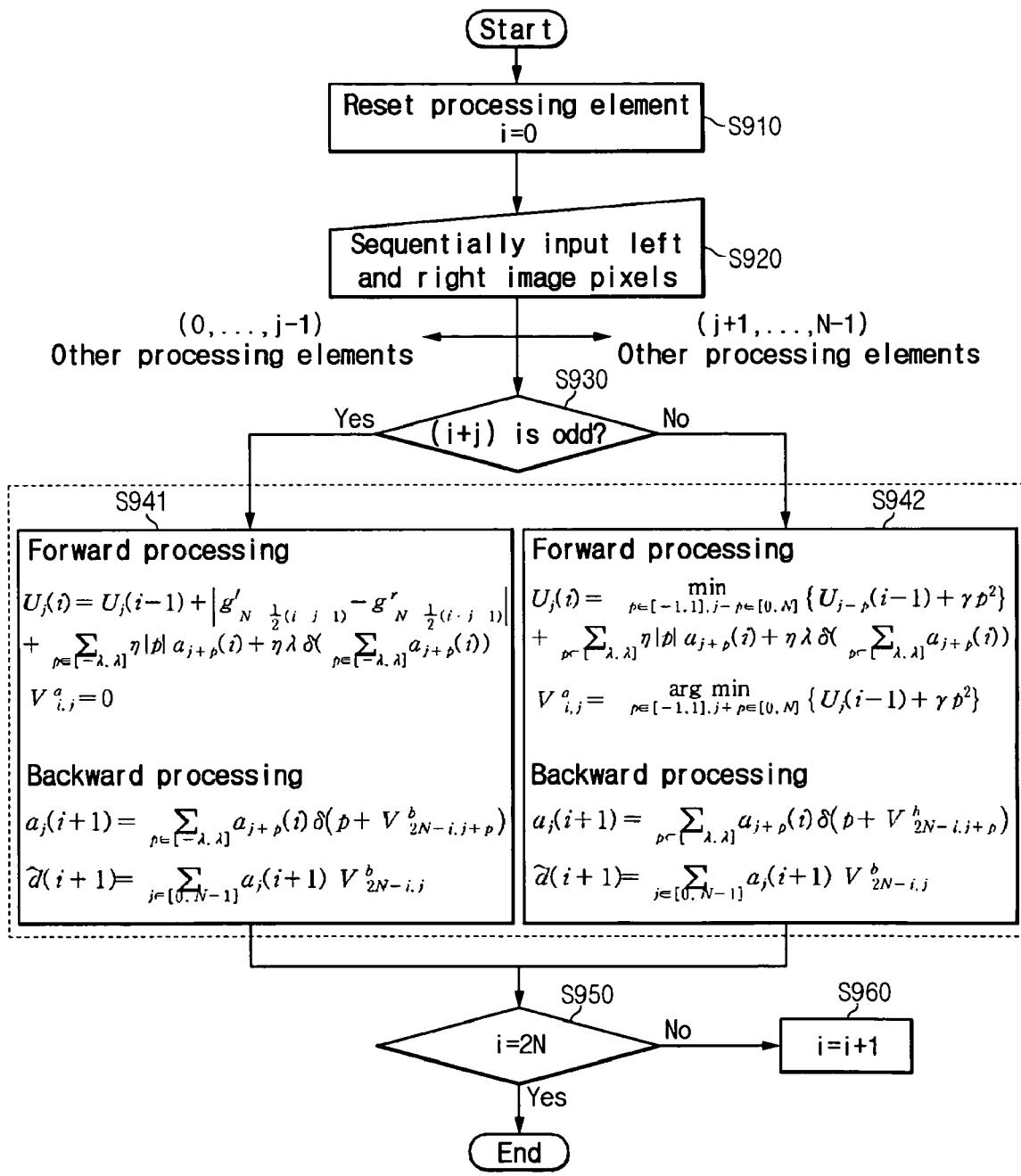

Referring to FIG. 8 and FIG. 9, a stereo image matching method in the stereo image matching system using plural image lines will be described in detail. The $0^{th}$ to $(N-1)^{th}$ processing elements are operated in parallel when the clock signals are counted from 0 to 2N in the first exemplary embodiment, and FIG. 8 and FIG. 9 will illustrate the $j^{th}$ processing element for ease of description.

In order to use the disparity value of the line in the processing element and control the backward processor bp$_j$ and the forward processor fp$_j$ to be concurrently operated in the first embodiment, performance of hardware is differed according to the state in which image lines on the epipolar lines are odd or even from among the total images so as to synchronize the multi-line processing activation signal and the forward processor since the multi-line processing activation signal is differed by the output of the decision value. Therefore, the input buffer 310 differently arranges the order of pixel data depending on whether the index of an image line is odd or even.

The pixel data of even image lines will be described with reference to FIG. 8, and the pixel data of odd image lines will be described with reference to FIG. 9.

FIG. 8 and FIG. 9 respectively show a flowchart for the stereo image matching system according to the first exemplary embodiment to process pixel data of an even image line and a flowchart for the stereo image matching system to process pixel data of an odd image line.

The case in which pixel data of an even image line are input will be described with reference to FIG. 8. A cost $U_j(0)$, $j\in[1,N]$ when the processing element is reset at the $0^{th}$ clock (i=0) is given in Equation 1 in step S810.

$$U_j(0) = \begin{cases} 0 & \text{if } j = 0, \\ \infty & \text{otherwise} \end{cases} \quad \text{Equation 1}$$

Referring to FIG. 5, the left image register $I_1$ and the right image register $r_{N/2}$ sequentially receive left and right image pixel data from the input buffers 311 and 312, and the left and right image registers $I_1$ to $I_{N/2}$ and $r_1$ to $r_{N/2}$ shift the pixel data to the adjacent image registers $I_1$ to $I_{N/2}$ and $r_1$ to $r_{N/2}$ in step S820.

The processing element is differently operated depending on whether the sum (i+j) of the $i^{th}$ current clock signal and the position j of the processing element is odd or even. The forward processor fp$_j$ processes the pixel data of the current input image line, and the backward processor bp$_j$ reads a decision value processed by the forward processor fp$_j$ from the stack 325 and processes the decision value. It will be defined below that the backward processor bp$_j$ is operated in advance to the forward processor fp$_j$. Accordingly, since the forward processor fp$_j$ can write the decision value on the position which the backward processor bp$_j$ read in the stack 325, it is allowed for the decision value of a previous line and a decision value of a current line to share a stack. Therefore, the cost and the decision value which are output by the forward processor fp$_j$ of the $i^{th}$ current clock signal are represented to be $U_j(i)$ and $V_{i,j}$ respectively, and the activation signal and the disparity which are output by the backward processor bp$_j$ are represented to be $a_j(i+1)$ and $d(i+1)$ respectively.

The operation of the above-noted processing element will be described in detail for a case in which the sum of (i+j) is odd and a case in which the sum of (i+j) is even.

The controller 323i of the forward processor fp$_j$ and the controller 324f of the backward processor bp$_j$ determine whether the sum of the $i^{th}$ clock signal and the position j of the processing element is odd or even in step S830.

The controller 323i of FIG. 6 controls to output $U_j(t-1)$ as a cost in step S841 when the sum of (i+j) is found to be odd, and the controller 323i controls to output $U_j(t)$ as a cost in step S842 when the sum of (i+j) is found to be even.

In detail, since the output $U_j(t-1)$ of the adder 323d of the forward processor fp$_j$ becomes a cost when the sum of (i+j) is odd, the cost $U_j(i)$ at the $i^{th}$ clock signal is generated by adding a difference of left and right pixel data to the cost $U_j(i-1)$ at the previous clock signal and adding a multi-line cost thereto. The multi-line cost is given in Equation 2, the controller 323i receives a multi-line processing activation signal $a_{j+p}(i)$ calculated by the backward processor 324, and outputs $\eta|p|$ when $|p|$ is less than $\lambda$, and outputs $\eta\lambda$ when $|p|$ is greater than $\lambda$. The multi-line cost is used as a constraint condition for matching since it is calculated and output in consideration of the difference between the position (j+p) of the processing element of the input activation signal $a_{j+p}(i)$ and the position j of the forward processing fp$_j$.

$$\sum_{p\in[-\lambda,\lambda]} \eta|p|a_{j+p}(i) + \eta\lambda\delta\left(\sum_{p\in[-\lambda,\lambda]} a_{j+p}(i)\right) \quad \text{Equation 2}$$

where $\lambda$ is a range in which the multi-line processing activation signal $a_{j+p}(i)$ is transmitted to a near processing element, and $\eta$ determines a scale of the multi-line cost value.

The cost $U_j(i)$ at the $i^{th}$ clock signal is given in Equation 3 considering the multi-line cost, and the decision value in this instance is given to be 0.

$$U_j(i) = U_j(i-1) + \left|g^l_{\frac{1}{2}(i-j-1)} - g^r_{\frac{1}{2}(i+j-1)}\right| + \quad \text{Equation 3}$$
$$\sum_{p\in[-\lambda,\lambda]} \eta|p|a_{j+p}(i) +$$
$$\eta\lambda\delta\left(\sum_{p\in[-\lambda,\lambda]} a_{j+p}(i)\right)$$

When the sum (i+j) is even, the output $U_j(t-1)$ of the adder 323g of the forward processor fp$_j$ becomes a cost. Therefore, the cost $U_j(i)$ at the $i^{th}$ clock signal is given to be a value obtained by adding the multi-line cost of the cost memory 323b to the minimum value of $U_{j+1}(i-1)+\gamma$, $U_j(i-1)$, and $U_{j-1}(i-1)+\gamma$ as expressed in Equation 4. The decision value $V_{i,j}$ is a value for representing a path of the least cost, given in Equation 5.

$$U_j(i) = \min_{p\in[-1,1], j+p\in[0,N]} \{U_{j+p}(i-1) + \gamma p^2\} + \quad \text{Equation 4}$$
$$\sum_{p\in[-\lambda,\lambda]} \eta|p|a_{j+p}(i) +$$
$$\eta\lambda\delta\left(\sum_{p\in[-\lambda,\lambda]} a_{j+p}(i)\right)$$
$$V^b_{i,j} = \operatorname*{argmin}_{p\in[-1,1], j+p\in[0,N]} \{U_{j+p}(i-1) + \gamma p^2\} \quad \text{Equation 5}$$

where $$\arg\min_{x}\{f(x)\}$$

is a function for outputting a parameter x for minimizing f(x). A decision value output by the forward processor for the pixel data of the even image line from among the decision values $V_{i,j}$ will be denoted by $V_{i,j}^b$, and a decision value output by the forward processor for the pixel data of the odd image line will be denoted by $V_{i,j}^a$.

The decision values $V_{i,j}$ determined through the steps of S841 and S842 are stored in the stack 325.

The backward processor bpj reads a decision value $V_{2N-i,j}^a$ processed by the forward processor $fp_j$ from the stack 325. The output of the activation register 324b becomes an activation signal $a_j(i+1)$ according to control by the controller 324f in FIG. 7. That is, the OR gate 324a of FIG. 7 performs an OR operation on an activation signal $a_j(i)\delta(V_{2N-i,j}^a)$ processed by the current backward processor $bp_j$ at the previous clock signal and activation signals $a_{j-1}(i)\delta(1-V_{2N-i,j-1}^a)$ and $a_{j+1}(i)\delta(1+V_{2N-i,j+1}^a)$ processed by the adjacent backward processors $bp_{j-1}$ and $bp_{j+1}$ at the previous clock signal, and outputs a result signal. The result signal becomes an activation signal $a_j(i+1)$ at the current clock signal as given in Equation 6.

$$a_j(i+1) = \sum_{p \in [-\lambda, \lambda]} a_{j+p}(i)\delta(p + V_{2N-i,j+p}^a) \quad \text{Equation 6}$$

The tri-state buffer 324e receives the decision value $V_{2N-i,j}^a$ of the previous line from the stack 325, and outputs an optimal decision value $V_{2,N-i,j}^a$ for showing increment/decrement of disparity according to the activation bit $a_j(i+1)$ so that the sum of the decision values $V_{2N-i,j}^a$ becomes a disparity $\hat{d}(i+1)$. The tri-state buffer 324e outputs a decision value $V_{2N-i,j}^a$ when the activation bit $a_j(i+1)$ is high (i.e., '1'), and the tri-state buffer 324e outputs a high-impedance signal so that an output by another backward processor may not be hindered when the activation bit $a_j(i+1)$ is low (i.e., '0'). Therefore, the disparity $\hat{d}(i+1)$ is given in Equation 7.

$$\hat{d}(i+1) = \sum_{j \in [0, N-1]} a_j(i+1) V_{2N-i,j}^a \quad \text{Equation 7}$$

When the $i^{th}$ current clock signal is not 2N in step S850, the $i^{th}$ clock signal is increased by 1 in step S860 to repeat the same processes of S820, S830, S841, and S842. Hence, the disparity for the pixel data of the current image line is calculated.

Referring to FIG. 9, the case of inputting pixel data of an odd image line will be described. The processing element is reset at the $0^{th}$ clock signal (i=0), and the cost $U_j(0)$, $j \in [1,N]$ at the reset is given in Equation 1 in step S910.

Referring to FIG. 4, the left image register $I_1$ and the right image register $r_{N/2}$ sequentially receive pixel data of left and right image lines from the input buffers 311 and 312, and the left and right image registers $I_1$ to $I_{N/2}$ and $r_1$ to $r_{N/2}$ shift the pixel data to the adjacent image registers $I_1$ to $I_{N/2}$ and $r_1$ to $r_{N/2}$ in step S920. In this instance, the orders of the left and right image pixel data are rearranged to be $$g_{N-\frac{1}{2}(i-j-1)}^l \text{ and } g_{N-\frac{1}{2}(i-j-1)}^r.$$

In a like manner of FIG. 8, it is determined whether the sum (i+j) is odd or even in step S930, and when the sum (i+j) is odd, the controller 323i of FIG. 6 controls $U_j(t-1)$ to be output as a cost in step S941, and when the sum (i+j) is even, the controller 323i controls $U_j(t)$ to be output as a cost in step S942.

Therefore, since the output $U_j(t-1)$ of the adder 323d of the forward processor $fp_j$ becomes a cost when the sum (i+j) is odd, the cost $U_j(i)$ is given in Equation 8, and the decision value $V_{i,j}^a$ in this instance is 0.

$$U_j(i) = U_j(i-1) + \left| g_{N-\frac{1}{2}(i-j-1)}^l - g_{N-\frac{1}{2}(i+j-1)}^r \right| + \sum_{p \in [-\lambda, \lambda]} \eta |p| a_{j+p}(i) + \eta \lambda \delta \left( \sum_{p \in [-\lambda, \lambda]} a_{j+p}(i) \right) \quad \text{Equation 8}$$

When the sum (i+j) is even, the output $U_j(t-1)$ of the adder 323g of the forward processor $fp_j$ becomes a cost, and accordingly, the cost $U_j(i)$ and the decision value $V_{i,j}^a$ are given in Equations 9 and 10, respectively.

$$U_j(i) = \min_{p \in [-1,1], j+p \in [0,N]} \{U_{j+p}(i-1) + \gamma p^2\} + \sum_{p \in [-\lambda, \lambda]} \eta |p| a_{j+p}(i) + \eta \lambda \delta \left( \sum_{p \in [-\lambda, \lambda]} a_{j+p}(i) \right) \quad \text{Equation 9}$$

$$V_{i,j}^a = \arg\min_{p \in [-1,1], j+p \in [0,N]} \{U_j(i-1) + \gamma p^2\} \quad \text{Equation 10}$$

The decision value $V_{i,j}^a$ determined through the steps of S941 and S942 is stored in the stack 325.

In a like manner of FIG. 8, the backward processor $bp_j$ reads a decision value $V_{2N-i,j}^b$ processed by the forward processor $fp_j$ from the stack 325 as to an adjacent image line, and outputs an activation bit $a_j(i+1)$. The tri-state buffer 324e of the backward processor $bp_j$ receives the decision value $V_{2N-i,j}^b$ of the previous line from the stack 325, and outputs an optimal decision value $V_{2N-i,j}^b$ for showing increment/decrement of disparity according to the activation bit $a_j(i+1)$, and the sum of the decision values $V_{2N-i,j}^a$ becomes a disparity $\hat{d}(i+1)$. The activation bit $a_j(i+1)$ and the disparity $\hat{d}(i+1)$ are given in Equations 11 and 12.

$$a_j(i+1) = \sum_{p \in [-\lambda, \lambda]} a_{j+p}(i)\delta(p + V_{2N-i,j+p}^b) \quad \text{Equation 11}$$

$$\hat{d}(i+1) = \sum_{j \in [0, N-1]} a_j(i+1) V_{2N-i,j}^b \quad \text{Equation 12}$$

When the $i^{th}$ current clock signal is not 2N in step S950, the $i^{th}$ clock signal is increased by 1 in step S960 to repeat the steps of S920, S930, S941, and S942. The disparity for the pixel data of the current image line is calculated through the above-described process.

The stereo image matching method processed by the stereo image matching system according to the first embodiment has been described, which can also be processed by software. A software-based stereo image matching method according to a second exemplary embodiment will be described in which processing elements are performed not in parallel but in series.

Figure 10:
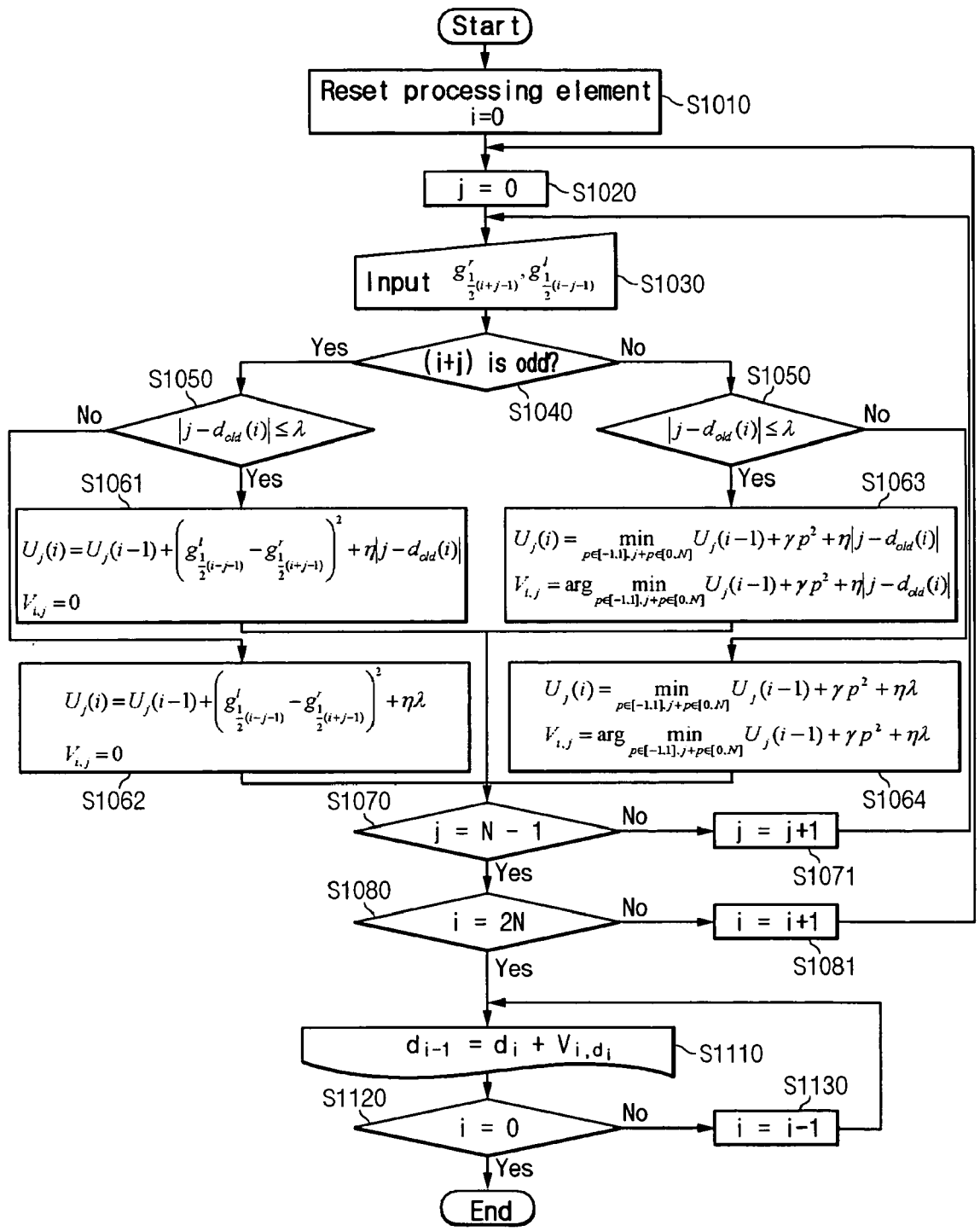
FIG. 10 shows a forward processing and backward processing flowchart in the stereo image matching method according to a second exemplary embodiment of the present invention.

FIG. 10 shows a flowchart for a stereo image matching method according to a second exemplary embodiment of the present invention.

Referring to FIG. 10, processing elements are reset in step S1010, and the position j of a processing element to be processed is established to be 0 in step S1020, as given in Equation 1.

The pixel data $$g^l_{\frac{1}{2}(i-j-1)} \text{ and } g^r_{\frac{1}{2}(i+j-1)}$$

of the left and right image lines are input to the forward processor $fp_j$ from the left and right image registers $I_1$ to $I_{N/2}$ and $r_1$ to $r_{N/2}$ in step S1030, it is determined whether the sum (i+j) is odd or even in step S1040, and $\lambda$ and a difference between the position j of the current processing element and the disparity value $d_{old}(i)$ of the previous line are compared in step S1050.

The cost $U_j(i)$ is calculated by Equation 13 in step S1061 when the sum (i+j) is odd and $|j-d_{old}(i)|$ is equal to or less than $\lambda$, the cost $U_j(i)$ is calculated by Equation 14 in step S1062 when the sum (i+j) is odd and $|j-d_{old}(i)|$ is greater than $\lambda$, and the decision value $V_{i,j}$ is established to be 0 when the sum (i+j) is odd.

$$U_j(i) = U_j(i-1) + \left(g^l_{\frac{1}{2}(i-j-1)} - g^r_{\frac{1}{2}(i+j-1)}\right)^2 + \eta|j - d_{old}(i)| \quad \text{Equation 13}$$

$$U_j(i) = U_j(i-1) + \left(g^l_{\frac{1}{2}(i-j-1)} - g^r_{\frac{1}{2}(i+j-1)}\right)^2 + \eta\lambda \quad \text{Equation 14}$$

In this instance, the cost $U_j(i)$ and the decision value $V_{i,j}$ are calculated in step S1063 as given in Equations 15 and 16 when the sum (i+j) is even and $|j-d_{old}(i)|$ is equal to or less than $\lambda$, and the cost $U_j(i)$ and the decision value $V_{i,j}$ are calculated in step S1064 as given in Equations 17 and 18 when the sum (i+j) is even and $|j-d_{old}(i)|$ is greater than $\lambda$.

$$U_j(i) = \min_{p \in [-1,1], j+p \in [0,N]} \{U_{j+p}(i-1) + \gamma p^2 + \eta|j - d_{old}(i)|\} \quad \text{Equation 15}$$

$$V_{i,j} = \arg\min_{p \in [-1,1], j+p \in [0,N]} \{U_{j+p}(i-1) + \gamma p^2 + \eta|j - d_{old}(i)|\} \quad \text{Equation 16}$$

$$U_j(i) = \min_{p \in [-1,1], j+p \in [0,N]} \{U_{j+p}(i-1) + \gamma p^2 + \eta\lambda\} \quad \text{Equation 17}$$

$$V_{i,j} = \arg\min_{p \in [-1,1], j+p \in [0,N]} \{U_{j+p}(i-1) + \gamma p^2 + \eta\lambda\} \quad \text{Equation 18}$$

The cost $U_j(i)$ and the decision value $V_{i,j}$ are calculated through the steps S1061, S1062, and S1063 or S1064, and it is determined whether the position j of the current forward processor $fp_j$ is $(N-1)^{th}$ in step S1070. When the position j is not $(N-1)^{th}$, the position j is increased by 1 in step S1071, and the process is repeated from the step of S1030.

When the position j is $(N-1)^{th}$, that is, when the costs $U_j(i)$ and the decision values $V_{i,j}$ are calculated for the forward processors $fp_j$, it is determined whether the $i^{th}$ current clock signal is 2N in step S1080. When the $i^{th}$ current clock signal is not 2N, the $i^{th}$ current clock signal is increased by 1 in step S1081, and the process is repeated from the step of S1020. When the $i^{th}$ current clock signal is 2N, that is, when the process of the forward processor $fp_j$ is finished for the clock signals, the backward processor $bp_j$ is processed.

The backward processor uses the disparity $d_j$ and the decision value $V_{i,d_j}$ established in the previous stage to calculate the disparity $d_{j-1}$ in the current stage as given in Equation 19, and update $d_{old}(i)$ with $d_{old}(i)=d_i$ in step S1110.

$$d_{j\ldots1} = d_j + V_{i,d_j} \quad \text{Equation 19}$$

It is determined whether the $i^{th}$ current clock signal is 0 in step S1120, and when it is not 0, the $i^{th}$ current clock signal is decreased by 1 in step S1130, and the process is repeated from the step of S110.

Figure 11:
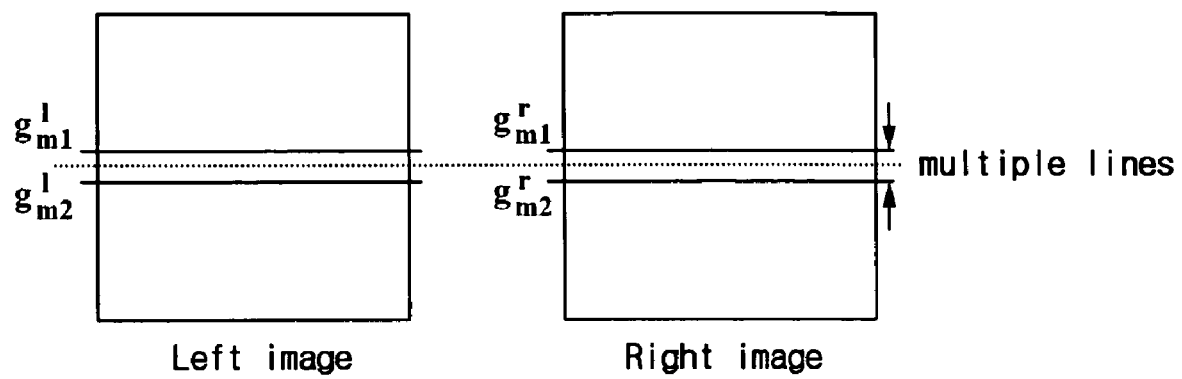
FIG. 11 shows a stereo image matching method according to an exemplary embodiment of the present invention.
Figure 12:
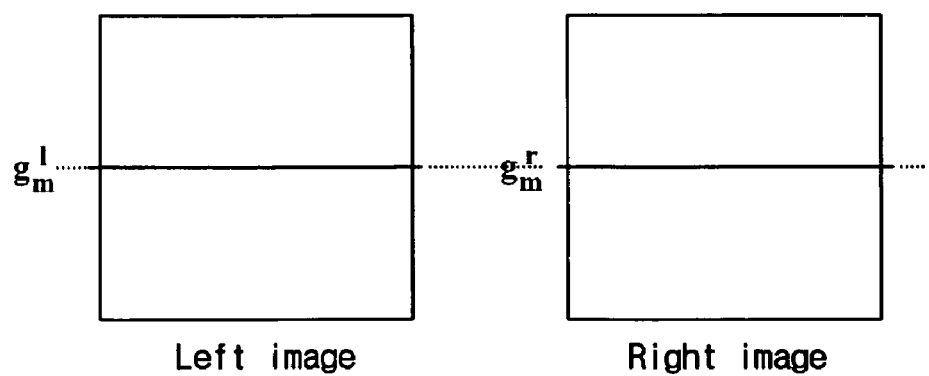
FIG. 12 shows a conventional stereo image matching method.
Figure 13A:
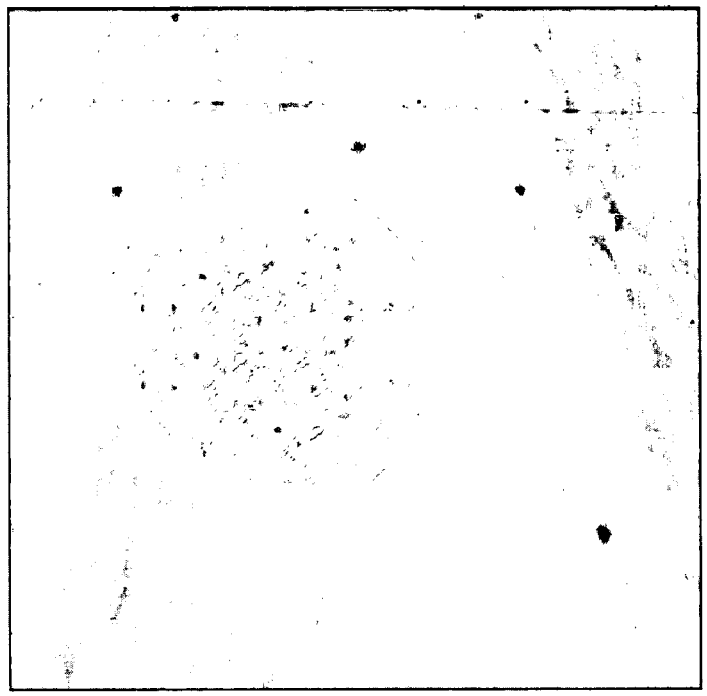
FIG. 13A and FIG. 13B show a left image and a right image respectively.
Figure 13B:
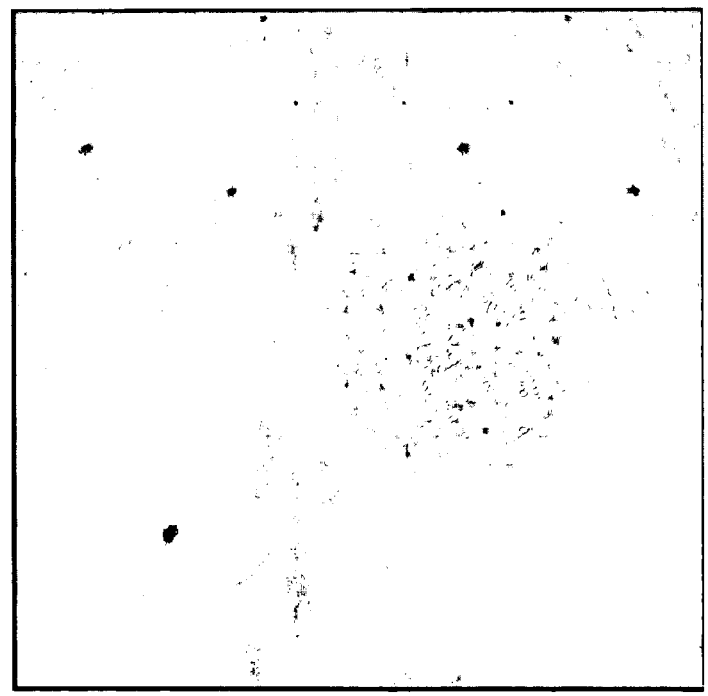
Figure 13C:
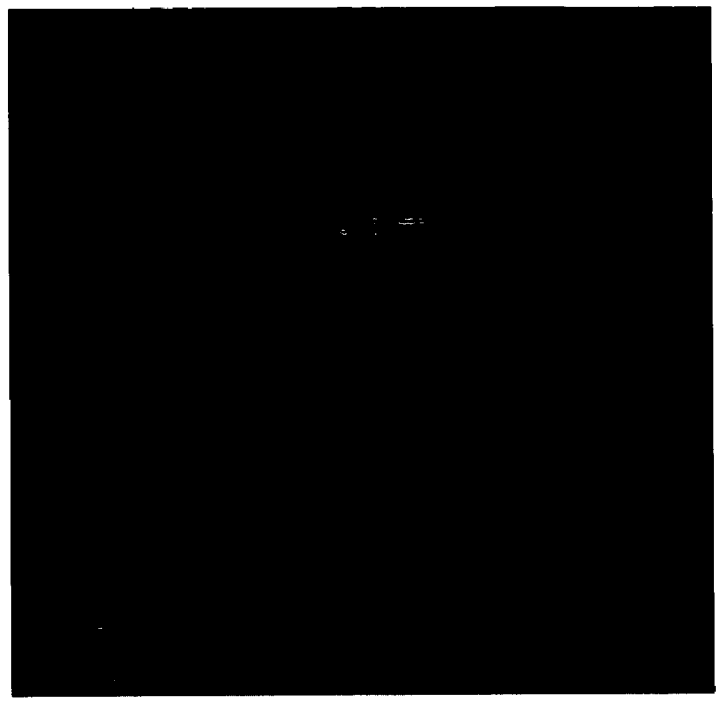
FIG. 13C and FIG. 13D show results of processing the images of FIG. 13A and FIG. 13B using the method of FIG. 11 and FIG. 12.
Figure 13D:
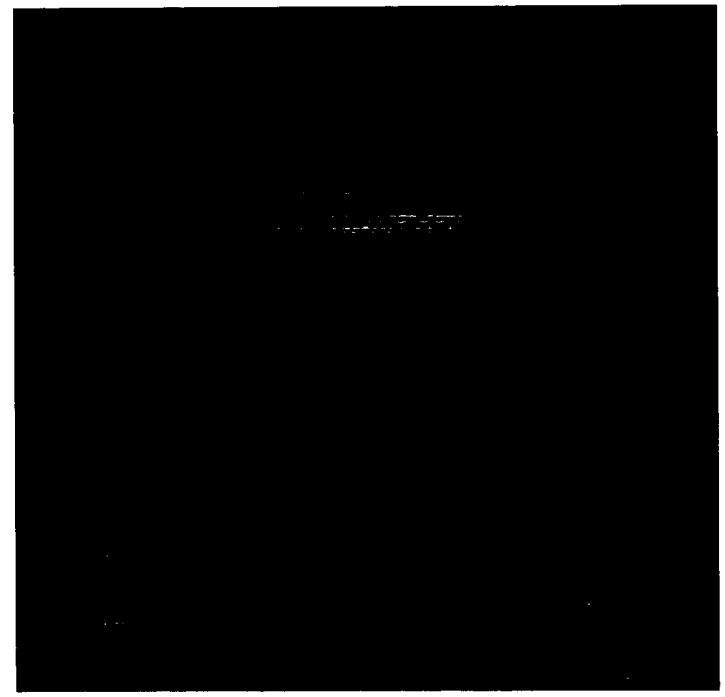

According to the exemplary embodiments of the present invention, as shown in FIG. 11, image lines $g_{m1}^l\text{-}g_{m2}^l$ and $g_{m1}^r\text{-}g_{m2}^r$ on adjacent plural epipolar lines are received, and the constraint condition between lines in the case of matching stereo images is used to reduce the error of disparity. That is, the difference of the disparity value which is distance data between image lines of disparity images is used to be the constraint condition at the time of matching the stereo images on the assumption that the surface of an object is relatively gentle. Therefore, much noise is eliminated as shown in FIG. 13C compared to FIG. 13D when the left and right images of FIG. 13A and FIG. 13B are input.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

According to the present invention, the disparity is calculated at a high speed and is encoded with a high compression rate. Further, stable distance images are obtained since noise in the vertical direction is eliminated by using the geometric constraint condition between image lines on the epipolar lines.

What is claimed is:

1. A stereo image matching method using image lines, comprising:
   receiving left and right pixel data from left and right cameras;
   arranging left and right pixel data of image lines on epipolar lines, and sequentially outputting them to a plurality of first and second image registers;
   allowing the forward processors to determine predetermined costs from the left and right pixel data output by the first and second image registers and track a first decision value for determining the costs; and
   allowing the backward processors to output a second decision value which is an optimal decision value from the first decision value for the previous image line,
   wherein the forward processors and the backward processors are concurrently performed.

2. The stereo image matching method of claim 1, wherein the forward processor transmits and receives cost values to/from adjacent forward processors, and the backward processor transmits and receives activation signals to/from adjacent backward processors.

3. The stereo image matching method of claim 2, wherein the activation signal comprises a multi-line processing activation signal for calculating a multi-line cost, and a backward processing activation signal.

4. The stereo image matching method of claim 3, wherein the step for tracking the first decision value by the forward processor comprises:

calculating a matching cost by using a difference between the first and second pixel data;

determining a multi-line cost by using the multi-line processing activation signal;

adding the matching cost and the multi-line cost to a fed back value;

outputting the least cost from among the added value and the costs of adjacent forward processors, and outputting the first decision value for showing the path of the least cost;

adding the multi-line cost to the least cost, and feeding back the added result; and adding an occlusion value to the value obtained by adding the multi-line cost to the least cost, and outputting the added value to the adjacent forward processor.

5. The stereo image matching method of claim 4, wherein the forward processor uses a difference between the position of the processing element of the multi-line processing activation signal and the position of the forward processor to calculate the multi-line cost.

6. The stereo image matching method of claim 3, wherein the step for outputting the second decision value by the backward processor comprises:

performing an OR operation on an activation signal of an adjacent backward processor and a fed back activation signal;

demultiplexing the ORed value according to the first decision value;

determining the second decision value from the first decision value according to the ORed value; and storing the ORed value and outputting a multi-line activation signal.

7. The stereo image matching method of claim 1, wherein the second decision values output by the backward processors are added to output a disparity value.

8. The stereo image matching method of claim 1, further comprising: excluding a path which has a very rare probability of geometric existence from the sum of second decision values, and compressing the second decision values.

* * * * *